United States Patent [19]

Rector

[11] Patent Number: 4,829,489

[45] Date of Patent: May 9, 1989

[54] METHOD OF DETERMINING DRILL STRING VELOCITY

[75] Inventor: James W. Rector, Menlo Park, Calif.

[73] Assignee: Western Atlas International, Inc., Houston, Tex.

[21] Appl. No.: 201,653

[22] Filed: Jun. 1, 1988

[51] Int. Cl.⁴ .............................................. G01V 1/40
[52] U.S. Cl. ...................................... 367/82; 367/191
[58] Field of Search ..................... 367/27, 33, 82, 191, 367/57; 340/853, 860, 861, 857

[56] References Cited

U.S. PATENT DOCUMENTS

| | | |
|---|---|---|
| 4,003,017 | 1/1977 | Bailey ..................................... 367/81 |
| 4,021,773 | 5/1977 | Keenan ................................. 367/82 |
| 4,718,048 | 1/1988 | Starou et al. .......................... 367/40 |

Primary Examiner—Thomas H. Tarcza
Assistant Examiner—Ian J. Lobo
Attorney, Agent, or Firm—E. Eugene Thigpen

[57] ABSTRACT

The invention is a method of determining the acoustic velocity of a drill string in a borehole. An acoustic signal is generated at a first location along the drill string, and detected at a second location. The detected signal is autocorrelated and the time of occurrence of multipath reflections on the autocorrelation record is utilized to determine acoustic velocity.

16 Claims, 2 Drawing Sheets

METHOD OF DETERMINING DRILL STRING VELOCITY

BACKGROUND OF THE INVENTION

1. Field of the Invention

This invention relates to acoustic logging within a wellbore and more particularly to determination of acoustic velocity in a drill string.

2. Description of the Prior Art

Conventional reflection seismology utilizes surface sources and receivers to detect reflections from subsurface impedance contrasts. Presently a technique commonly known as Vertical Seismic Profiling (VSP) is utilized to image the subsurface in the vicinity of the borehole. With VSP, typically, a source is activated at the surface and sensors are positioned at discrete borehole depths with a wireline. More recently methods have been developed for performing VSP with a downhole source and with receivers positioned on the surface. Data can be acquired simultaneously at many surface locations with little more expense than for a single location. One such method utilizes the drill bit as the downhole source. See, for example, U.S. Pat. No. 4,718,048 and U.S. patent application No. 939,359, having a filing date of Dec. 8, 1986. In this method, a sensor is positioned near the top of the drill string to record a reference or pilot signal and field sensors are positioned at selected locations in the vicinity of the wellbore. The signal generated by the drill bit travels up the drill string to the reference sensor and also propagates from the drill bit upward to the field sensors and also downwardly to reflecting subsurface interfaces and back to the field sensors. By correlating the signal detected by the pilot sensor with the signal detected by the field sensors, the travel times of the energy traveling from the drill bit to the field sensors may be determined. In order for this travel time to be determined, however, the acoustic velocity of the drill string must be known. In general, the acoustic velocity of the metals comprising the drill string is known, so that the acoustic velocity may be calculated fairly accurately without actually measuring the velocity in the wellbore. However, the actual acoustic velocity of drill pipe may vary slightly because of differences in temperature and pressure downhole and because of differences in dimensions and constituent metals of the drill pipe. Accordingly, it is desirable to measure the actual velocity of the acoustic signal in the drill string.

SUMMARY OF THE INVENTION

The invention is a method of determining the acoustic velocity of a drill string in a borehole. An acoustic signal is generated at a first location along the drill string, and detected at a second location. The detected signal is autocorrelated and the time of occurrence of multipath reflections on the autocorrelation record is utilized to determine acoustic velocity.

In a preferred embodiment, the acoustic signal is generated by the drill bit at the bottom of the borehole and the signal is detected by a sensor positioned near the top of the borehole. In a first embodiment of the invention, the detected signal is autocorrelated, the time difference between the autocorrelation peak and a peak resulting from a multipath reflection is measured and the drill string velocity is determined from the ratio of twice the length of the drill pipe between the receiving point and the origination point of the multipath reflection and the travel time of the reflection. In a second embodiment of the invention, the steps of generating and receiving the signals is repeated a plurality of times with the drill bit at increasing known depths, and the velocity is determined from the autocorrelation records by taking the ratio of twice the change in the distance from the receiving point to the point of multipath reflection and the change in time of occurrence of the multipath peak.

BRIEF DESCRIPTION OF THE DRAWINGS

A more complete understanding of this invention may be gained from the appended detailed description and the drawings, wherein.

DESCRIPTION OF THE PREFERRED EMBODIMENT

Figure 1:
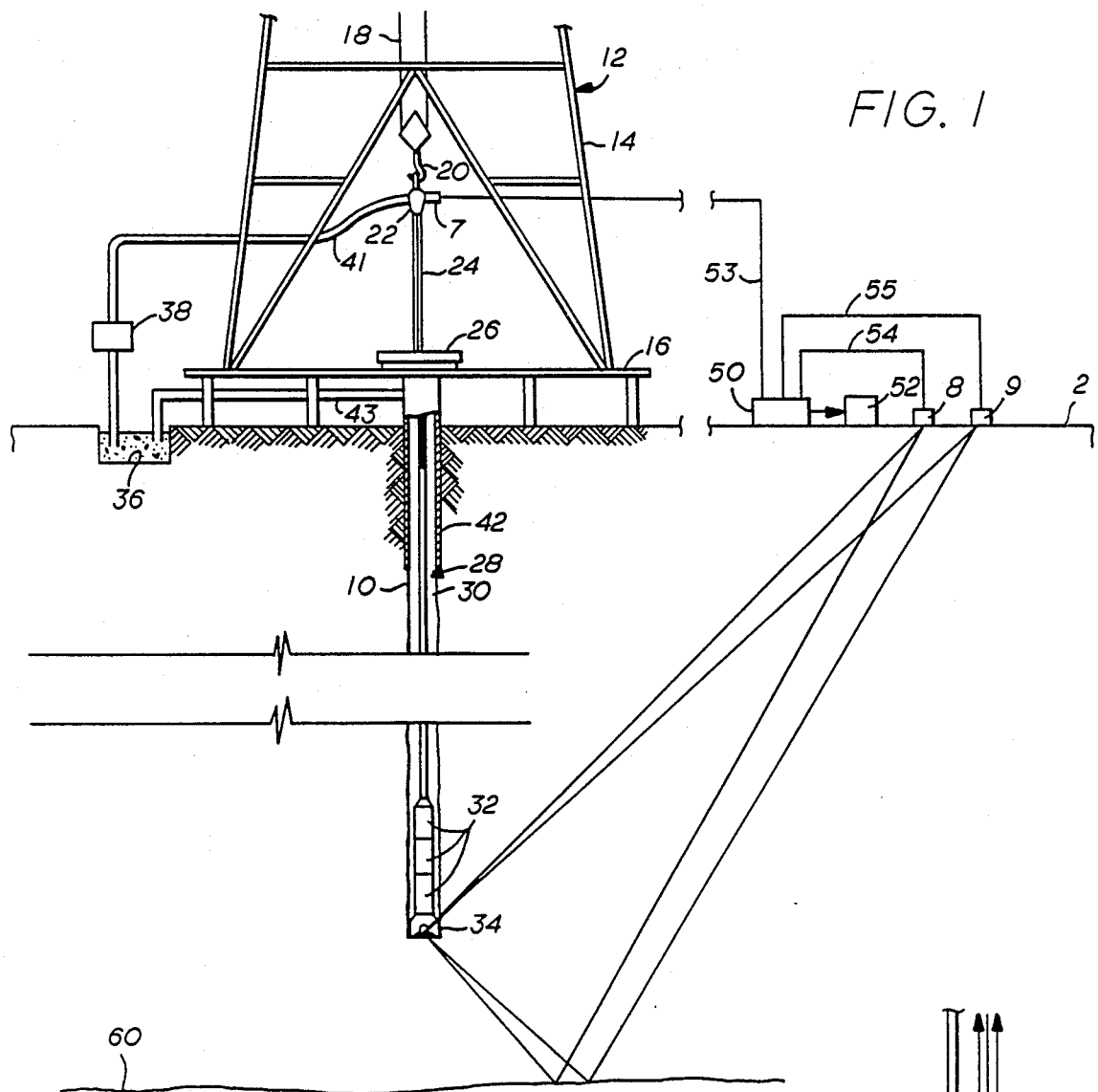
FIG. 1 shows the deployment of apparatus for practicing the invention.

FIG. 1 shows a well 10 being drilled in the earth with a rotary drilling rig 12. The drilling rig includes the usual derrick 14, derrick floor 16, draw works 18, hook 20, swivel 22, kelly joint 24, rotary table 26, and a drill string 28 made up of drill pipe 30 secured to the lower end of a kelly joint 24 and to the upper end of a section of drill collars 32, which carry a drill bit 34. Drilling fluid circulates from a mud pit 36 through a mud pump 38 and a mud supply line 41 and into the swivel 22. The drilling mud flows down through the kelly joint, drill string and drill collars, and through nozzles (not shown) in the lower face of the drill bit. The drilling mud flows back up through an annular space 42 between the outer diameter of the drill string and the well bore to the surface, where it is returned to the mud pit through a mud return line 43.

A reference sensor 7 is mounted on the upper portion of the drill string 28. In a particular preferred embodiment, reference sensor 7 is mounted on swivel 22. Normally, a plurality of field sensors, such as geophones 8 and 9, are located on the surface 2 at suitable locations. The sensor 7 and the geophones 8 and 9 are connected by means of conductors 53–55 or by telemetering to an amplifier 50 connected to a recorder 52. In a preferred embodiment sensor 7 may be an accelerometer.

The impact of the bit 34 on the rock at the bottom of the borehole 10 generates elastic waves which propagate vertically upward through the drill string, and radially outward into the earth formation. The drill string path has little attenuation of acoustic energy by virtue of its steel composition and, therefore, the signal received by the sensor 7 is representative of the vibrations emitted by the drill bit 34 into the earth formation. Signals emitted into the earth will travel upwardly to the field sensors and will also be reflected from subsurface interfaces, such as interface 60 beneath the drill bit, back to the field sensors. Normally, the transmission time of the signal from the drill bit to the field sensors is determined from cross-correlation of the signal detected by the sensor 7 with the signals detected by the field sensors.

In order to determine the signal transmission time to the field sensors, the acoustic transmission time from the drill bit to the reference sensor must be determined. Normally, drill pipe is manufactured in standard lengths so that the distance between the drill bit and the reference sensor is determinable by counting the number of drill pipe sections added to the drill string. The transmission time can then be calculated if the acoustic velocity is known. The invention comprises a method of determining velocity.

Figure 2:
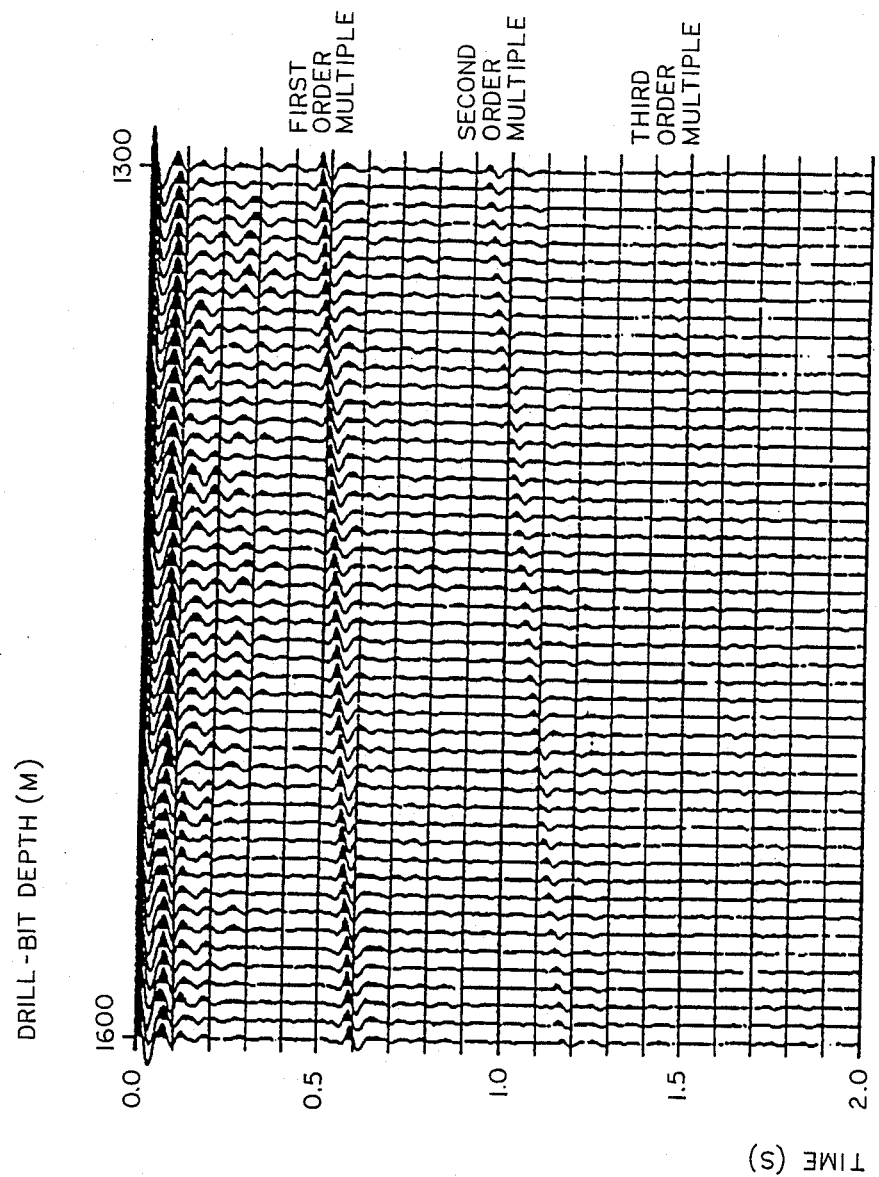
FIG. 2 shows autocorrelation traces of the reference sensor signal.

FIG. 2 shows a number of traces which are the autocorrelation of signals recorded from the reference sensor with the drill bit at depths increasing from 1300 meters to 1600 meters. As is well known to those of ordinary skill in the art, the maximum peak of an autocorrelation function occurs at t=0.

Figure 3:
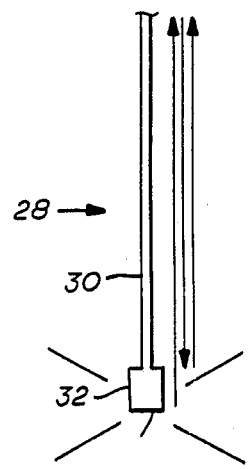
FIG. 3 illustrates the multiple reflection path.

FIG. 2 shows additional peaks between about 0.48 and 0.6 seconds, and between 0.94 and 1.2 seconds, and a less perceptible peak between about 1.4 and 1.7 seconds. These additional peaks result from multiple reflections of the drill bit signal. As an acoustic signal travels through the drill string, a portion of the signal will be reflected from locations where the diameter of the drill string changes. When the signal reaches the top of the drill string, the signal is reflected back down the drill string because of the abrupt discontinuity at the interface between the drill pipe and swivel. The point of maximum reflection of the downward traveling energy will usually be from the point where the drill collars are attached to the drill pipe. When the signal reaches the interface between the drill pipe and drill collars a portion of the signal is reflected back up the drill pipe. This first reflection signal appears on the autocorrelation records of FIG. 2 as the First Order Multiple. A portion of the signal will be reflected a second and third time from the top of the drill string and from the interface between the drill pipe and drill collar and appears as the Second Order Multiple and Third Order Multiple on the autocorrelation record. FIG. 3 illustrates the transmission path of the multiple reflections. A portion of the acoustic energy which passes through the drill pipe-drill collar interface is also reflected from the bottom of the drill string back to the surface, and a number of other points of discontinuity in the drill string may reflect a portion of the energy, but the point of maximum energy reflection is normally from the drill pipe-drill collar interface.

The time lapse between the time t=0 of the autocorrelation function and the First Order Multiple peak represent the two-way travel time of the acoustic signal between the upper and lower reflection locations, which typically are the top of the drill string and the interface between the drill pipe and the drill collar, so that the acoustic velocity is determined from the ratio:

$$velocity = 2d/t$$

where "d" is the distance from the top of the drill string to the interface between the drill pipe and drill collar and "t" is the time of occurrence on the autocorrelation trace. Of course, the second and third order multiple peaks may also be utilized in a similar manner. For the Second Order Multiple, velocity=4d/t. For the Third Order Multiple, velocity=6d/t.

In a second embodiment of the invention, the change in the occurrence of the multiple peaks with a change in depth of the drill bit may be utilized to perform the calculations. As the depth of the well increases, the distance to the top of the drill string from the lower reflecting interface increases, as well as the time delay of the return of the multiple reflections. The following relationships may be used for determining velocity:

For the First Order Multiple, $$velocity = 2\Delta d/\Delta t$$

For the Second Order Multiple, $$velocity = 4\Delta d/\Delta t.$$

For the Third Order Multiple, $$velocity = 6\Delta d/\Delta t.$$

where "$\Delta d$" is the change in length of the drill string and "$\Delta t$" is the change in the time of the occurrence of the multiple reflection. From the example of FIG. 2 velocity may be computed from the First Order Multiple as about:

$$2(1600-1300) \text{ meters}/(0.6-0.48 \text{ second}) = 5000 \text{ meters/second}$$

The method described herein as the first embodiment of the invention yields the average acoustic velocity of the entire length of the drill string between the point of the lower signal reflection location (normally the drill pipe-drill collar interface) and the sensor location. Typically, the velocity in any remaining portion of the drill string (typically, the drill collars and bit) can be assumed to have the same velocity as the portion of the drill string over which the multiple reflection traveled without introducing significant error.

The method described herein as the second embodiment yields the acoustic velocity within a given zone of the drill string. If measurements are made over substantially the entire length of the well, then the average velocity of substantially the entire length of the drill string may be measured utilizing the second embodiment of the invention. This second embodiment of the invention is also especially useful for measuring interval velocity.

Because the results utilizing the two embodiments of the invention should be substantially the same, the two embodiments may be utilized together to check for errors.

Although the specific ways and means for practicing the invention have been described and illustrated in the accompanying drawings, it is nevertheless to be understood that this has been done for purposes of illustration only and the scope of the invention is not limited thereby but is determined from the appended claims.

I claim:

1. A method of determining acoustic velocity of a drill string in a wellbore comprising:
    generating an acoustic signal at the lower end of said drill string;
    detecting said acoustic signal at the upper end of said drill string;
    autocorrelating the detected signal, thereby generating an autocorrelation signal; and
    utilizing the time of occurrence of a multipath reflection signal in said autocorrelation signal to determine acoustic velocity in said drill string.

2. The method of claim 1 wherein said acoustic signal is generated by the rotation of a drill bit positioned on the lower end of said drill string.

3. The method of claim 2 wherein said acoustic signal is detected on a swivel positioned at the top of said drill string.

4. The method of claim 3 wherein said drill string includes drill pipe and at least one drill collar connected to the lower end of the drill pipe and said reflection signal results from reflection at substantially the top of said drill string and at the interface between said drill pipe and drill collar.

5. A method of determining acoustic velocity of a drill string in a wellbore comprising:

generating an acoustic signal at the lower end of said drill string;

detecting said acoustic signal at the upper end of said drill string;

autocorrelating said detected signal, thereby generating an autocorrelation signal;

measuring the time difference between the maximum autocorrelation peak and a multipath peak on the autocorrelation signal, said multipath peak resulting from reflections from an upper location and a lower location on said drill string; and utilizing a relation between the length of drill string between the upper and lower reflection locations and the measured time difference to calculate velocity.

6. The method of claim 5 wherein said acoustic signal is generated by rotation of a drill bit positioned at the lower end of said drill string.

7. The method of claim 6 wherein said drill string includes drill pipe and at least one drill collar connected to the lower end of the drill pie and said multipath reflection signal results from reflections at substantially the top of said drill string and at the interface between said drill pipe and said drill collar.

8. The method of claim 7 wherein a first order multipath reflection signal is utilized to determine velocity and velocity is determined from the relation $$velocity = 2d/t$$

where "d" is the distance between two reflection locations along said drill string and "t" is the time delay between the maximum autocorrelation peak of the autocorrelation signal and a first order multipath reflection signal.

9. The method of claim 7 wherein a second order multipath reflection signal is utilized to determine velocity and velocity is determined from the relation $$velocity = 4d/t$$

where "d" is the distance between two reflection locations along said drill string and "t" is the time delay between the maximum autocorrelation peak of the autocorrelation signal and a second order multipath reflection signal.

10. The method of claim 7 wherein a third order multipath reflection signal is utilized to determine velocity and velocity is determined from the relation $$velocity = 6d/t$$

where "d" is the distance between two reflection locations along said drill string and "t" is the time delay between the maximum autocorrelation peak of the autocorrelation signal and a third order multipath reflection signal.

11. A method of determining acoustic interval velocity of a drill string in a wellbore comprising:

(a) generating an acoustic signal at the lower end of said drill string;

(b) detecting said acoustic signal at the upper end of said drill string;

(c) repeating steps (a) and (b) with said signal being generated at a plurality of depths, the difference in the length of the drill string at said depths being known;

(d) autocorrelating said detected acoustic signals, thereby generating autocorrelation signals;

(e) determining velocity from a relationship between the change in length of the drill string and the change in time of occurrence of a multipath peak in the autocorrelation signals.

12. The method of claim 11 wherein said acoustic signal is generated by rotation of a drill bit positioned at the lower end of said drill string.

13. The method of claim 12 wherein said drill string includes drill pipe and at least one drill collar connected to the lower end of the drill pipe and said multipath reflection signals results from reflections at substantially the top of said drill string and at the interface between said drill pipe and said drill collar.

14. The method of claim 13 wherein a first order multipath reflection signal is utilized to determine interval velocity and interval velocity is determined from the relation $$Velocity = 2\Delta d/\Delta t$$

where "$\Delta d$" is the change in length of the drill string and "$\Delta t$" is the change in the time of occurrence of the first order multipath reflection signal.

15. The method of claim 13 wherein a second order multipath reflection signal is utilized to determine interval velocity and interval velocity is determined from the relation $$velocity = 4\Delta d/\Delta t$$

where "$\Delta d$" is the change in length of the drill string and "$\Delta t$" is the change in the time of occurrence of the first order multipath reflection signal.

16. The method of claim 13 wherein a third order multipath reflection signal is utilized to determine interval velocity and interval velocity is determined from the relation $$velocity = 6\Delta d/\Delta t$$

where "$\Delta d$" is the change in length of the drill string and "$\Delta t$" is the change in the time of occurrence of the first order multipath reflection signal.

* * * * *